(12) United States Patent
Maeda et al.

(10) Patent No.: US 7,519,360 B2
(45) Date of Patent: Apr. 14, 2009

(54) MOBILE DEVICE AND CONTENT TRANSMISSION METHOD

(75) Inventors: Kenichi Maeda, Mitaka (JP); Takayuki Orii, Sagamihara (JP)

(73) Assignee: NTT DoCoMo, Inc., Tokyo (JP)

( * ) Notice: Subject to any disclaimer, the term of this patent is extended or adjusted under 35 U.S.C. 154(b) by 395 days.

(21) Appl. No.: 11/326,523

(22) Filed: Jan. 6, 2006

(65) Prior Publication Data

US 2006/0173954 A1   Aug. 3, 2006

(30) Foreign Application Priority Data

Jan. 6, 2005   (JP)   ............... 2005-001715

(51) Int. Cl.
*H04M 3/00* (2006.01)
*H04M 1/66* (2006.01)
(52) U.S. Cl. .............. 455/419; 455/418; 455/420; 455/410; 455/411
(58) Field of Classification Search .......... 455/410, 455/411, 418, 419, 420
See application file for complete search history.

(56) References Cited

U.S. PATENT DOCUMENTS

2002/0169977 A1* 11/2002 Chmaytelli ............... 713/200
2004/0015573 A1* 1/2004 Yuki et al. ................. 709/220
2006/0020547 A1* 1/2006 Lipsanen .................... 705/51

FOREIGN PATENT DOCUMENTS

| CN | 1472977 | 2/2004 |
|----|---------|--------|
| CN | 1526251 | 9/2004 |
| EP | 1 383 349 A2 | 1/2004 |
| EP | 1 429 569 A1 | 6/2004 |
| JP | 10-149283 | 6/1998 |
| WO | WP 02/073992 A1 | 9/2002 |

* cited by examiner

*Primary Examiner*—Barry W Taylor
(74) *Attorney, Agent, or Firm*—Oblon, Spivak, McClelland, Maier & Neustadt, P.C.

(57) ABSTRACT

The present invention provides a mobile device that makes it simple to perform content updates. The mobile device comprises a content storage portion for storing content, a content update portion for updating the content of the content storage portion, a user information storage portion for storing user information as saved user data, an input acceptance portion for accepting the inputted user information as input user data, and a sameness judgment portion for judging the sameness of the saved user data and the input user data. When the sameness judgment portion judges that the saved user data and the input user data are not the same, the content update portion erases the content stored in the content storage portion, requests that content corresponding with the input user data be transmitted to the mobile communication network to which the mobile device belongs and stores the transmitted content in the content storage portion.

9 Claims, 3 Drawing Sheets

MOBILE DEVICE AND CONTENT TRANSMISSION METHOD

BACKGROUND OF THE INVENTION

1. Field of the Invention

The present invention relates to a mobile device and content transmission method.

2. Description of the Related Art

It is known that when models of a mobile device such as a cellular phone are exchanged and one user uses a plurality of mobile devices, the mobile device identifies the user by replacing a module (USIM, for example) in which information such as telephone numbers is stored, thereby enabling the user to use the mobile device.

When usage of a new mobile device is thus enabled, the user needs to either transport content that can be used by the new mobile device from the previously used mobile device or perform an update by newly acquiring content from a server via the network.

Further, methods that move a usage license in order to use application software installed on a certain computer on another computer are known (Japanese Patent Application Laid Open No. H10-149283, for example).

The technology mentioned in Japanese Patent Application Laid Open No. H10-149283 assumes that there is a computer connected to a general communication line and also allows one user to simultaneously use a plurality of computers, for example. Therefore, license management such as that mentioned in Japanese Patent Application Laid Open No. H10-149283 is required.

The present inventor studied the characteristics of mobile communication networks and performed a study on whether a simple content update was not possible on the basis of the fact that only one mobile device can be used for each user (per contract) as a general rule. The present invention was conceived on the basis of the knowledge derived from this study.

SUMMARY OF THE INVENTION

Therefore, an object of the present invention is to provide a mobile device and content transmission method that make it possible to easily perform content updates.

The mobile device of the present invention comprises content storing means for storing content that can be used by the mobile device; content updating means for updating the content stored by the content storing means; user information storing means for storing, as saved user data, user information for specifying the user of the mobile device; input accepting means for accepting, as input user data, the user information for specifying the user of the mobile device when the user information is inputted; and sameness judging means for judging the sameness of the saved user data and the input user data, wherein, when the judgment result of the sameness judging means indicates that the saved user data and the input user data are not the same, the content updating means erases content stored in the content storing means, requests that content corresponding with the input user data be transmitted to the mobile communication network to which the mobile device belongs, and stores the content transmitted from the mobile communication network in accordance with the request to the content storing means.

According to the mobile device of the present invention, when the sameness judging means judge that the saved user data and the input data are not the same, the mobile device erases the content stored by the content storing means and stores the content transmitted from the mobile communication network in accordance with the request of the mobile device in the content storing means. Therefore, the user is able to update the content easily without being conscious of work such as that involved in the transfer from the previously used mobile device, for example, when a new mobile device can be used, and in performing an update by newly acquiring content from the server via a network.

Further, in the case of the mobile device of the present invention, after a predetermined time elapses since content stored by the content storing means has been erased, the mobile device may issue a request to the mobile communication network to which the mobile device belongs to transmit content corresponding with the input user data. Such a constitution makes it possible for the user to secure the time for updating content at a time desired by the user.

In addition, the mobile device of the present invention may comprise display means for displaying the content that is transmitted from the mobile communication network. Such a constitution makes it possible to confirm that content used by the previously used mobile device can be used by the new device. In addition, content designed by the content provider can be displayed by the display means of the mobile device as content corresponding with the input user data. For example, in the mobile communication network to which the mobile device belongs, when input user data has not been registered, content indicating the fact that input user data is not registered can be displayed by the display means.

Further, the content transmission method of the present invention is a content transmission method for transmitting content that can be used by a mobile device, comprising: an input acceptance step in which input accepting means accepts, as input user data, user information for specifying a user of the mobile device when the user information is inputted; a sameness judgment step in which sameness judging means judges the sameness of user information for specifying the user of the mobile device that is stored by the user information storing means as saved user data, and the input user data; an erasure step in which the content updating means erases content stored by the content storing means when the judgment result of the sameness judgment step indicates that the saved user data and the input user data are not the same; a content transmission request step in which the content updating means requests that content corresponding with the input user data be transmitted to the mobile communication network to which the mobile device belongs; a content generation step in which the server generates content corresponding with the input user data in accordance with the request of the content transmission request step; a content transmission step in which the server transmits the content generated in the content transmission request step to the mobile device; and a content storage step in which the content updating means stores the transmitted content in the content storing means.

According to the content transmission method of the present invention, as per the case of the invention of the mobile device above, when it is judged that the saved user data and the input user data are not the same in the sameness judgment step, the mobile device erases pre-stored content and stores the content transmitted from the server in accordance with the request of the mobile device. Therefore, the user is able to update the content easily without being conscious of work such as that involved in the transfer from the previously used mobile device, when a new mobile device can be used, and in performing an update by newly acquiring content from the server via a network.

In addition, the content transmission method of the present invention may comprise an automatic transmission step in which the server transmits content corresponding with input user data to the mobile device when the server newly receives user information corresponding with input user data. As a result, when new content can be used by using means other than a mobile device with a certain authority that is used by the user (that is, a mobile device that is being used), a special operation is not executed and the user is able to obtain the content transmitted from the server.

The present invention makes it possible to perform a content update easily in cases where user data that is not the same as the saved user data is inputted to the mobile device.

DESCRIPTION OF THE PREFERRED EMBODIMENTS

The findings of the present invention can be easily understood by considering the following detailed description with reference to the attached drawings shown only for the purpose of exemplification. Embodiments of the present invention will be successively described with reference to the attached drawings.

Figure 1:
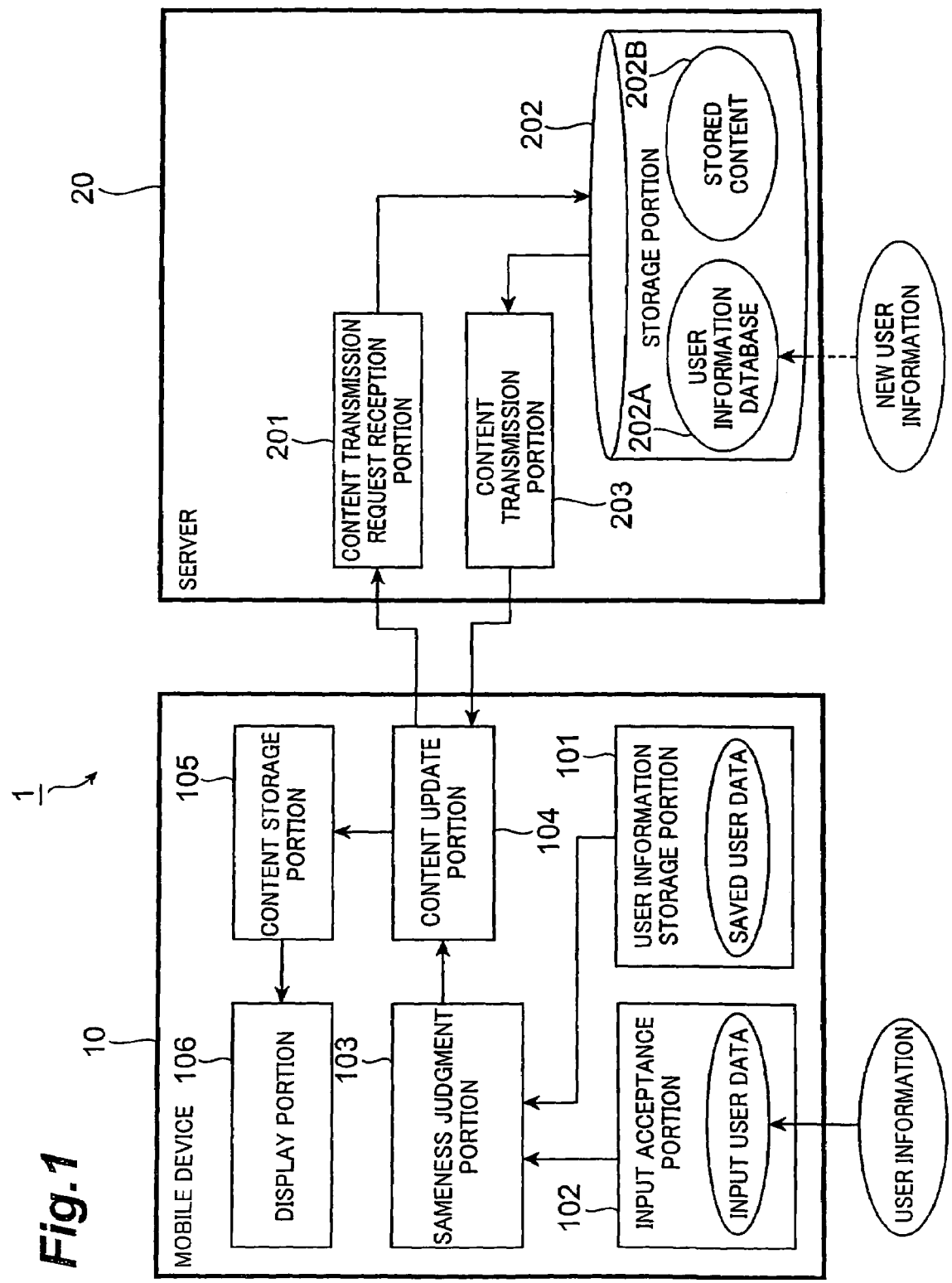
FIG. 1 is a system constitutional view showing an embodiment of the content transmission system of the present invention.

First, the constitution of the content transmission system of the present invention will be described with reference to FIG. 1. The content transmission system 1 shown in FIG. 1 comprises a mobile device 10 and a server 20, which are constituted to permit the mutual communication of information.

The mobile device 10 is an information communication terminal used by a user, examples of which include a cellular phone or PDA with a communication function.

The mobile device 10 comprises, as functional constituent elements, a user information storage portion 101 (user information storing means), an input acceptance portion 102 (input accepting means), a sameness judgment portion 103 (sameness judging means), a content update portion 104 (content updating means), a content storage portion 105 (content storing means) and a display portion 106.

The functions of each of the elements constituting the mobile device 10 will be described successively.

The user information storage portion 101 is a part for storing user information for specifying the user of the mobile device 10 as saved user data. The form of the user information is not particularly limited. However, not only information such as telephone numbers and passwords but also organism information such as the user's fingerprint, iris, and so forth, can be used.

The input acceptance portion 102 is a part that accepts user information for specifying the user of the mobile device 10 as input user data when the user information is inputted. The means for inputting the user information is not particularly limited. However, it is possible to use a module that stores information such as telephone numbers (a USIM, for example), an input portion such as a number key, a fingerprint identification unit, an iris identification unit (none of which is illustrated), and so forth.

The sameness judgment portion 103 is a part that receives the input of the saved user data of the user information storage portion 101 and the input user data of the input acceptance portion 102 and judges the sameness of the two data. The judgment of the sameness thereof is performed on the basis of whether the saved user data and input user data are completely the same. For example, when a user for which the saved user data and input user data differ is specified, the sameness judgment portion 103 judges that the two data are not the same. Further, the sameness judgment portion 103 also judges that the two data are not the same when saved user data does not exist, for example. More specifically, when a telephone number that is stored in a module as user information inputted to the mobile device 10 is used, it is judged whether a telephone number that is stored in the user information storage portion 101 and a telephone number that is read from the module by the input acceptance portion 102 are the same. The sameness judgment portion 103 outputs information indicating the sameness judgment result for the input user data and saved user data to the content update portion 104.

The content update portion 104 is a part that updates content stored in the content storage portion 105 on the basis of the sameness judgment result that is outputted from the sameness judgment portion 103. Further, the content update portion 104 is a part that stores new content in the content storage portion 105 when the time during which content is not stored in the content storage portion 105 exceeds a set limit time (predetermined time). More specifically, the content update portion 104 has functions to erase content stored in the content storage portion 105, request the transmission of content from the mobile communication network (server 20 in this embodiment) to which the mobile device belongs, receive the content that is transmitted from the mobile communication network, and store this content in the content storage portion 105.

The content storage portion 105 is a part that stores content that can be used by the mobile device. The content that is stored in the content storage portion 105 is updated as a result of being erased and rewritten by the content update portion 104. Further, the stored content is outputted to the display portion 106.

The display portion 106 is a part that displays content stored in the content storage portion 105. As a result, it is possible to display content that is transmitted from the mobile communication network to the mobile device and monitor the nature of the content.

The functions of each of the elements constituting the server 20 will be described next.

A content transmission request reception portion 201 is a part that receives a content transmission request that is transmitted from the content update portion 104 of the mobile device 10 and outputs the request to the storage portion 202.

The storage portion 202 is a part that receives the content transmission request that is outputted by the content transmission request reception portion 201 and generates content that is transmitted to the mobile device from stored content 202B, which is content received and stored from an external server or the like. Further, the storage portion 202 comprises a user information database 202A for associating input user data from the mobile device with the corresponding content. The storage portion 202 uses the user information database 202A to generate content that corresponds with input user data from the stored content 202B and output the content to a content transmission portion 203. Further, the user information database 202A may receive new user information from an external server (a server of the content provider other than server 20 or a server of the mobile communication network provider, for example) and may add and update the user information.

The content transmission portion 203 is a part that receives the content that is outputted from the storage portion 202 and transmits the content to the content update portion 104 of the mobile device 10.

In this embodiment, although a server is used as means for transmitting content that corresponds with input user data in the mobile communication network to which the mobile device belongs, the means are not particularly limited as long as the means are capable of transmitting content.

Figure 2:
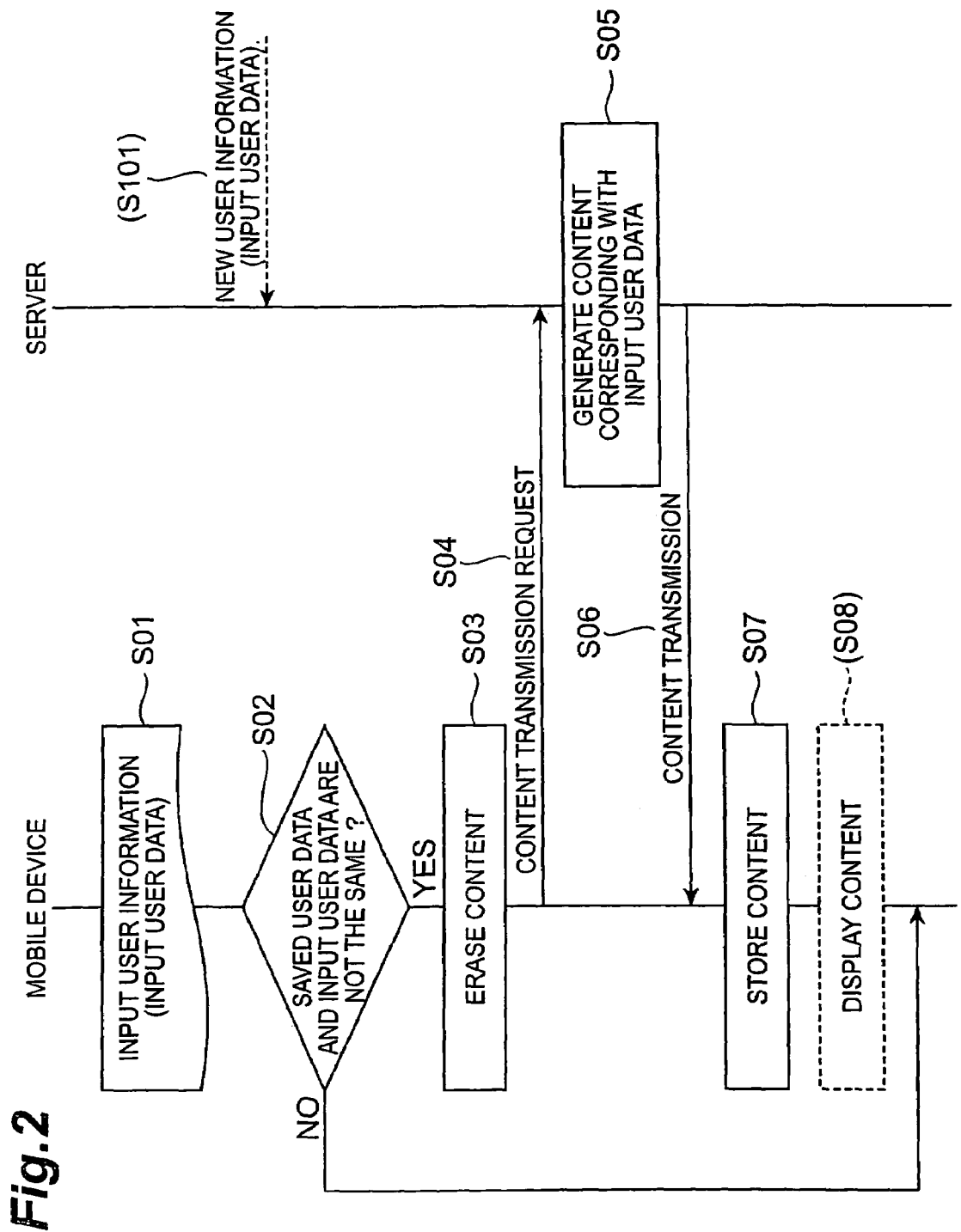
FIG. 2 is a sequence diagram showing the operation of the content transmission system shown in FIG. 1.

The operation of the content transmission system 1 will be described next with reference to FIG. 2.

When user information for specifying the user such as a telephone number or fingerprint is inputted to the mobile device, the input acceptance portion 102 accepts the user information as input user data (S01). After accepting the input user data, the sameness judgment portion 103 judges the sameness of the saved user data and input user data stored in the user information storage portion 101 (S02). When the saved user data and input user data are not the same, the sameness judgment portion 103 outputs information to that effect to the content update portion 104 and the content update portion 104 erases the content of the content storage portion 105 (S03). On the other hand, when the saved user data and input user data are the same, the processing is ended.

After erasing the content in step S03, the content update portion 104 issues a request for the transmission of content corresponding with the input user data to the server 20 (that is, the constituent element of the mobile communication network to which the mobile device 10 belongs) (S04). Further, the content update portion 104 may request that the server 20 transmit content after a predetermined time (two hours, for example) has elapsed since the erasure of content of the content storage portion 105. As a result, the user is able to secure time for updating content at the time he or she desires.

Figure 3:
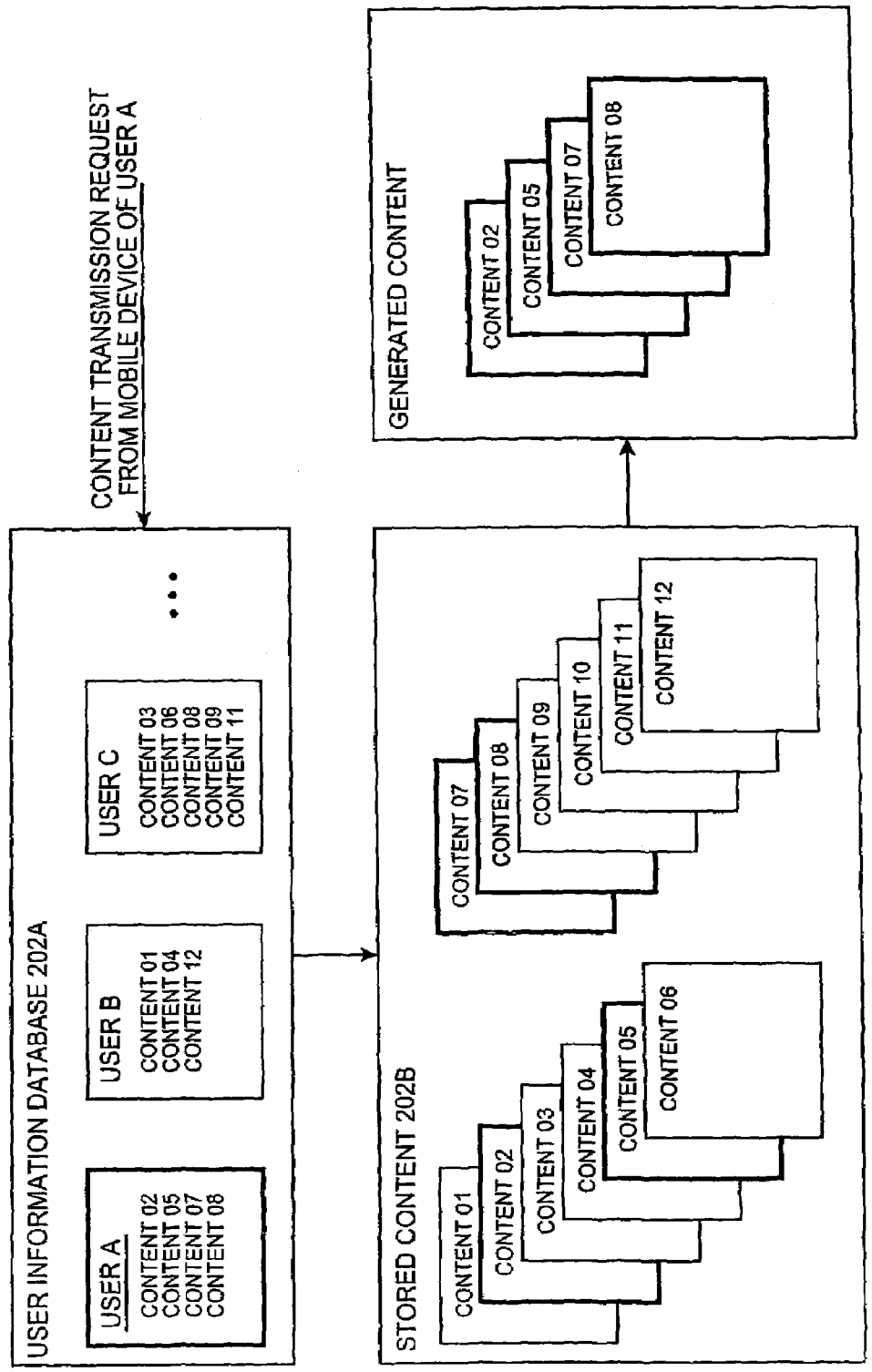
FIG. 3 shows the generation of content in the storage portion of the server. server.

The content transmission request reception portion 201 of the server 20 receives the content transmission request from the content update portion 104 of the mobile device 10 and, upon receiving the content transmission request, the storage portion 202 generates content corresponding with input user data while using a user information database 202A (S05). FIG. 3 shows the generation of content in the storage portion 202 in a case where a content transmission request is transmitted from the mobile device of a user A. The storage portion 202 identifies the fact that the user of the mobile device that transmitted the content transmission request is user A and uses the user information database 202A to confirm that the content that user A can use is content 02, content 05, content 07, and content 08. Following confirmation, the storage portion 202 extracts content 02, content 05, content 07 and content 08 from the content stored in the storage content 202B and generates content that is transmitted to the mobile device 10.

The content transmission portion 203 receives an input from the storage portion 202 and transmits the generated content to the content update portion 104 of the mobile device 10 (S06). The content update portion 104 stores the content received from the content transmission portion 203 in the content storage portion 105 (S07) and ends processing.

By operating as described above, in cases where a mobile device is exchanged or one user uses a plurality of mobile devices, when a new mobile device is used, the content transmission system 1 of the present invention is able to update content simply without the user being conscious of the work of transferring content from the previously used mobile device or the work of newly acquiring content from a server via a network.

The display portion 106 displays content that is stored by the content storage portion 105 in step S07 (S08). Further, although step S08 appears after step S07 in FIG. 2, step S08 is an additional step that is not required by the present invention. Further, the time when the display portion 106 displays content may be before content is stored in the content storage portion 105 or at the same time as this storage. By providing this additional step, the user is able to visually confirm that content that was used by the previously used mobile device can be used by a new mobile device. In addition, content created by the content provider can be added to the content generated by the storage portion 202 in correspondence with the input user data and this content can be displayed on the display portion 106 of the mobile device. For example, when the data corresponding with the input user data has not been registered in the user information database 202A, the server 20 is able to display content indicating that user information has not been registered and content encouraging the registration of user information on the display portion 106.

In addition, a system transmission system may be constituted so that, when the server 20 newly receives data corresponding with input user data (new user information, for example) from an external server or the like (S101), content corresponding with the input user data is generated (S05), transmitted automatically to the mobile device 10 (S06), and stored in the content storage portion 105 by the mobile device 10 (S08). As a result, even when new content has become available as a result of registering user information in means (for example, a server of the content provider other than server 20 or a server of a mobile communication network provider) other than the mobile device with a certain authority that is used by the user (that is, a mobile device that is being used), the user is able to obtain new content from the server 20 without performing a special operation on the mobile device 10.

What is claimed is:

1. A mobile device, comprising:
content storing means for storing content that can be used by the mobile device;
content updating means for updating the content stored by the content storing means;
user information storing means for storing, as an entire saved user data, user information for specifying a user of the mobile device;
input accepting means for accepting, as input user data, the user information for specifying the user of the mobile device when the user information is input; and
equivalence determining means for determining whether the entire saved user data is equal to the input user data,
wherein the user information storing means stores a single data as saved user data, and when a result of the equivalence determining means indicates that the entire saved user data and the input user data are not equal, the content updating means erases the content stored by the content storing means, requests that new content corresponding to the input user data be transmitted to the mobile communication network to which the mobile device belongs and stores the new content transmitted from the mobile communication network in the content storing means.

2. The mobile device according to claim 1, wherein, after a predetermined time elapses from the time the content updating unit erases the content stored by the content storing unit, the mobile device issues a request to the mobile communication network to which the mobile device belongs to transmit the new content corresponding to the input user data.

3. The mobile device according to claim 1, further comprising:
   display means for displaying the new content that is transmitted from the mobile communication network.

4. The mobile device according to claim 2, further comprising:
   display means for displaying the new content that is transmitted from the mobile communication network.

5. A content transmission method for transmitting content that can be used by a mobile device, comprising:
   accepting, as input user data, user information for specifying a user of the mobile device when the user information is input;
   determining whether user information for specifying the user of the mobile device that is stored in a user information storing unit as an entire saved user data is equal to the input user data;
   erasing, using a content updating unit, the entire saved user data when the determining determines that the entire saved user data is not equal to the input user data;
   requesting, using the content updating unit, that new content corresponding to the input user data be transmitted to the mobile communication network to which the mobile device belongs;
   generating, using a server, the new content corresponding to the input user data in accordance with the content transmission requesting;
   transmitting, using the server, the new content generated by the generating to the mobile device; and
   storing, using the content updating unit, transmitted content in the content storing unit.

6. A mobile device, comprising:
   a content storing unit configured to store content that can be used by the mobile device;
   a content updating unit configured to update the content stored by the content storing unit;
   a user information storing unit configured to store, as an entire saved user data, user information for specifying a user of the mobile device;
   an input accepting unit configured to accept, as input user data, the user information for specifying a user of the mobile device when the user information is input; and
   an equivalence determining unit configured to determine whether the entire saved user data is equal to the input user data,
   wherein the user information storing unit stores a single data as saved user data, and when a result of the equivalence determining unit indicates that the entire saved user data and the input user data are not equal, the content updating unit erases the content stored by the content storing unit, requests that new content corresponding to the input user data be transmitted to the mobile communication network to which the mobile device belongs and stores the new content transmitted from the mobile communication network in the content storing unit.

7. The mobile device according to claim 6, wherein, after a predetermined time elapses from the time the content updating unit erases the content stored by the content storing unit, the mobile device issues a request to the mobile communication network to which the mobile device belongs to transmit the new content corresponding to the input user data.

8. The mobile device according to claim 7, further comprising:
   a display unit configured to display the new content that is transmitted from the mobile communication network.

9. The mobile device according to claim 6, further comprising:
   a display unit configured to display the new content that is transmitted from the mobile communication network.

* * * * *